F. X. BACHLE & W. W. WELLS.
ENGINE GOVERNOR.
APPLICATION FILED JULY 11, 1913.

1,117,759.

Patented Nov. 17, 1914.

2 SHEETS—SHEET 1.

WITNESSES:
D. C. Watter
F. E. Aul.

INVENTORS
Frank X. Bachle,
Walter W. Wells.
By Owen & Owen.
Their attys.

F. X. BACHLE & W. W. WELLS.
ENGINE GOVERNOR.
APPLICATION FILED JULY 11, 1913.

1,117,759.

Patented Nov. 17, 1914.

2 SHEETS—SHEET 2.

WITNESSES:
D. C. Walter
F. E. Aul.

INVENTORS
Frank X. Bachle,
Walter W. Wells.
By Owen & Owen,
Their attys.

UNITED STATES PATENT OFFICE.

FRANK X. BACHLE AND WALTER W. WELLS, OF CLYDE, OHIO, ASSIGNORS TO THE KREBS COMMERCIAL CAR COMPANY, OF CLYDE, OHIO, A CORPORATION OF OHIO.

ENGINE-GOVERNOR.

1,117,759.  Specification of Letters Patent.  Patented Nov. 17, 1914.

Application filed July 11, 1913. Serial No. 778,443.

*To all whom it may concern:*

Be it known that we, FRANK X. BACHLE and WALTER W. WELLS, citizens of the United States, and residents of Clyde, in the county of Sandusky and State of Ohio, have invented a certain new and useful Engine-Governor; and we do hereby declare the following to be a full, clear, and exact description of the invention, such as will enable others skilled in the art to which it apertains to make and use the same, reference being made to the accompanying drawings, and to the characters of reference marked thereon, which form a part of this specification.

This invention relates to engine governors, and particularly to means of this class adapted for use in connection with the internal combustion engines of automobiles, but is not restricted to such use as it may be used in any connection for which it may be adapted or appropriate.

The object of our invention is the provision of simple and improved means of this class, which is operable to accurately regulate the speed at which it may be desired to run an engine, and which is capable of easy and quick adjustment from the driver's seat in the associated vehicle, or from any other convenient point, to change the speed limit at will, thus making our improved governing means of particular value for use in motor driven commercial and pleasure vehicles.

A further object of our invention is the provision, in combination with a governor of the class described, of simple and efficient means for automatically controlling the time of ignition in proper accordance with the varying conditions of speed and load, whereby the engine will work at its maximum efficiency at all times.

The invention is fully described in the following specification, and while, in its broader aspect, it is capable of embodiment in numerous forms, a preferred embodiment thereof is illustrated in the accompanying drawings, in which,—

Figure 1:
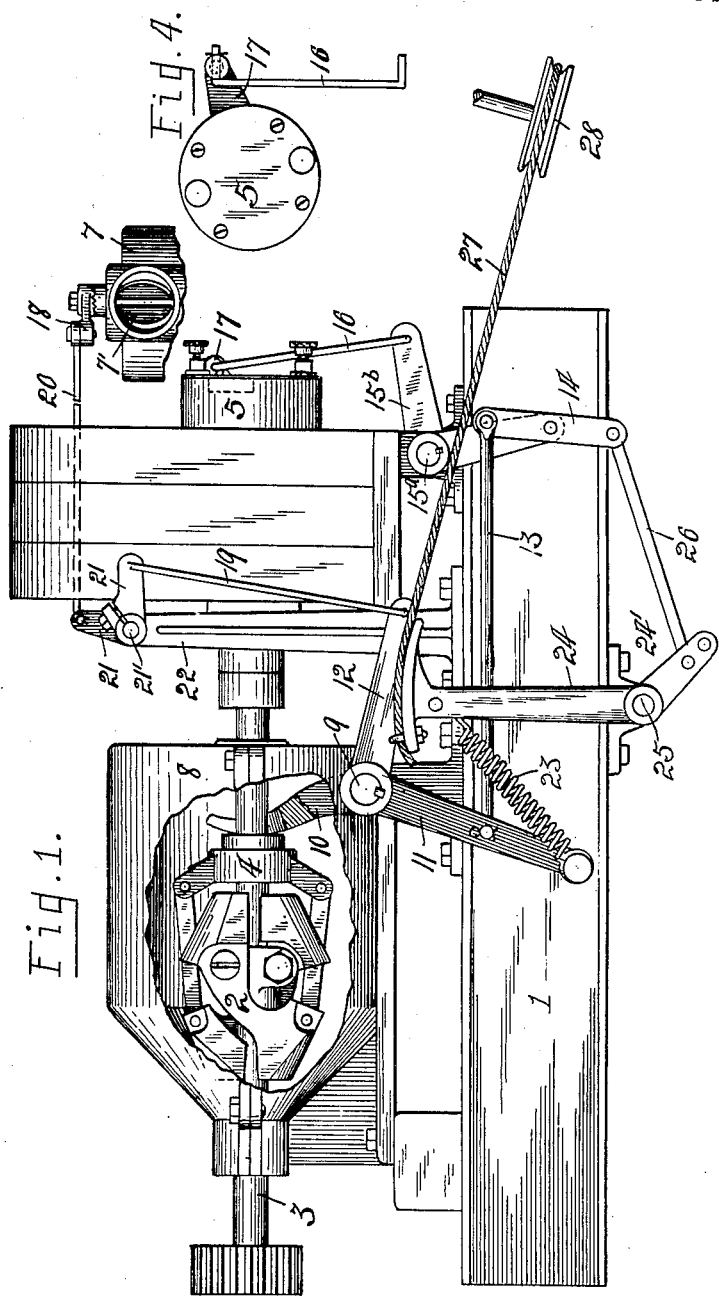
Figure 2:
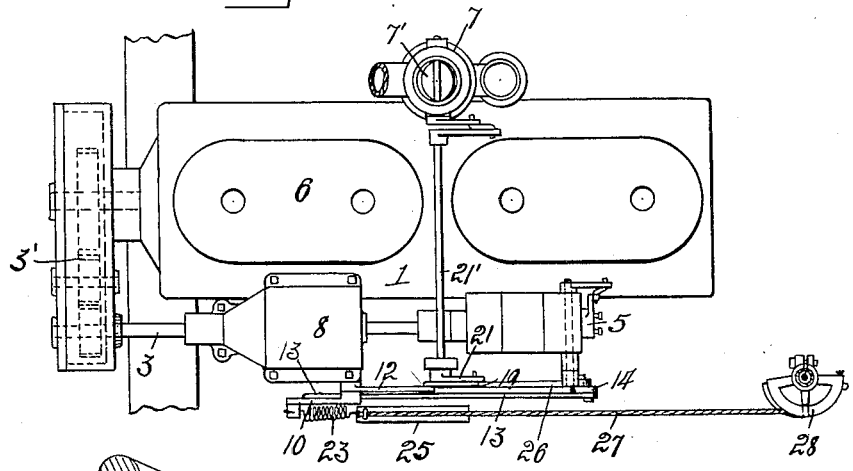
Figure 3:
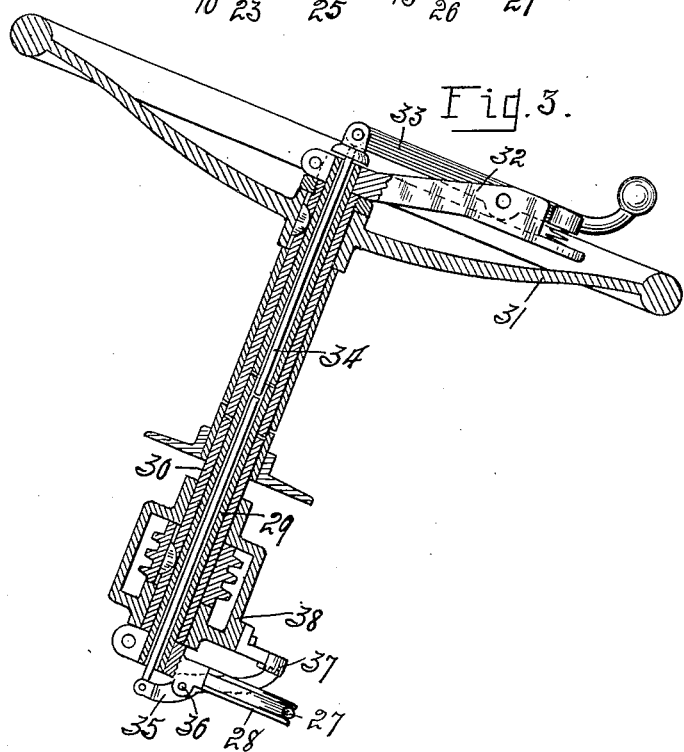

Figure 1 is a side elevation of an apparatus embodying our invention, with parts broken away. Fig. 2 is a plan of an engine and associated parts embodying the invention. Fig. 3 is an enlarged central vertical section of a steering mechanism with associated control parts of the invention, and Fig. 4 is a face view of the timer mechanism.

Referring to the drawings, 1 designates a portion of the supporting frame of a vehicle with which our improved mechanism is associated, or it may constitute any other suitable supporting part; 2 governor weights of any suitable form, which are rotatable with a shaft 3 and are connected to a sleeve 4 mounted for longitudinal sliding movements on said shaft, such movements being actuated by the governor weights upon a changing of the speed of running the shaft; 5 the timer mechanism for the ignition circuit of an associated engine 6, which mechanism may be of any suitable type, and 7 the engine carbureter having the customary throttle valve 7'. The governor shaft 3 is geared to the engine shaft, as at 3', or otherwise suitably connected thereto.

Projecting up within the governor case 8 from a rock-shaft 9 is an arm 10, the upper or free end of which is forked to adapt it to straddle the shaft 3 and bear against the outer side of the governor sleeve 4, whereby an outward movement of such sleeve from the governor weights effects a rocking of the arm 10 and shaft 9 in one direction. The shaft 9 is mounted in the base of the governor case 8, or in any other suitable part, and has arms 11 and 12 projecting therefrom in bell-crank lever form and adapted to have rocking movements therewith. The arm 11 is connected by a rod or link member 13 to the upper end of a lever 14, which is pivoted substantially centrally of its ends to a crank-arm 15 on one end of a rock-shaft 15ª, which is mounted in a convenient frame part. An arm 15ᵇ on the other end of such shaft is connected by a rod or link member 16 to the movable part 17 of the timer mechanism, whereby the time of sparking of the ignition circuit of the engine is advanced or retarded, as the throttle is opened or closed, as is well understood in the art.

The lever-arm 12 is connected to the throttle-valve arm 18 of the carbureter in any suitable manner, as, for instance, through the rods 19 and 20 and the interposed bell-crank lever connection 21, the shaft 21' of which is mounted on a bearing-standard 22 and carries the lever arm at opposite ends thereof. It will, of course, be understood that the form of the connection between the arms 12 and 18 may be changed according to the relative positions of such arms. It is thus evident that a rocking of the forked arm 10 by an outward movement of the governor sleeve 4 effects an adjustment of both the timer mechanism and the carbureter throttle to suit the speed of desired running of the engine.

The centrifugal force of the revolving mass of the governor, which mass, in the present instance, comprises the weights 2, is opposed or counterbalanced by a coiled contractile spring 23, or other suitable means of an elastic nature, which connects the free end of the lever-arm 11 and an adjustable part, which part, in the present instance, is in the form of a rocker-arm 24 that is pivoted to the frame 1, as at 25, the tension of the spring on the arm 11 being changed by a movement of the part 24 in one or the other direction relative to said arm. The arm 24 has an extension or finger 24' projecting from its fulcrum end, and this finger is connected by a rod or link-member 26 to the opposite end of the lever 14 from that to which the rod 13 connects, for the purpose hereinafter described.

It is evident from the above that any increase of speed in the engine increases the centrifugal force of the weights so that they are no longer balanced by the pull of the spring, thus permitting the weights to move out farther from the axis of rotation, and this movement of the weights is communicated as hereinafter described, or in any other suitable manner, to the throttle or means controlling the supply of energy to the engine, an outward movement of the weights reducing the supply of energy by closing the throttle, and an inward movement increasing the supply by opening the throttle. Since the outward movement of the weights increases the radius of the circle in which they rotate, and since centrifugal force varies directly as the radius of rotation, the tension of the spring must be increased a like amount in order that it will be able to pull in the weights and effect an opening of the throttle as soon as the speed falls below normal. A spring could be used that is just stiff enough to balance the weights in either their inner or outer or any intermediate position, at exactly the same speed, thus providing what is known as an isochronous governor; but with such a spring a very slight change of speed causes the weights to move to their extreme position, and hence they would be constantly moving from one extreme position to another, a condition known as a "hunting" governor. It has been common practice to make the spring a little stiffer than is required to actually balance the weights so that the speed when the engine is fully loaded is about 2% less than when running idle, that is, for example, if the engine makes 98 R. P. M. under full load (weights in) and half of the load is thrown off, the speed will increase to 99 R. P. M., and then the spring will balance the weights in their middle position. Throwing off all the load allows the engine to speed up slightly and the weights reach their outer position and effect a closing of the throttle when the speed reaches 100 R. P. M. If a spring more flexible than required for isochronous governing were used, the centrifugal force and spring tension would balance at one speed with the weights in their outer position and at a higher speed with the weights in their inner position with the result that the engine would run with the throttle wide open until the speed reaches the maximum, and then the weights would move out closing the throttle tight until the speed dropped to the lower limit, then open wide again, etc., making a bad case of "hunting". Since centrifugal force varies as the radius of rotation and also as the square of the number of R. P. M. it will be seen that it is necessary to employ different springs or different weights or a different relation between the weights and spring if it is desired to use the governor at different speeds. For instance, at 1000 R. P. M., centrifugal force is twenty-five times as great as at 200 R. P. M. hence, the spring must be twenty-five times as stiff, or have twenty-five times as much leverage on the weights, if it is to govern to the same decree of accuracy.

With our improved governing mechanism different springs or weights are not required, but instead thereof the position of the spring is shifted, so as to change the leverage with which it acts, and this shifting is done while the engine is in motion and carrying its load, giving accurate automatic control of the speed regardless of changes of load and throughout a wide range of speeds.

In order to control the movements of the part 25 from the driver's seat in the associated vehicle, in the present instance, a cable or other suitable draft means 27 is attached at one end to the free end of the arm 24 and at its other end to the periphery of the wheel segment 28, which is carried at the lower end of the hollow shaft 29 that extends up through the steering column 30 of the vehicle, being suitably mounted therein. The upper end of the shaft 29 projects without the upper end of the steering column 30 above the steering wheel 31 and has an arm 32 projecting laterally therefrom, as shown in Fig. 2, whereby a swinging of such arm effects a rocking of the segment 28 to move the cable 27. A lever member 33 is fulcrumed to the arm 32 within a longitudinally extending surface recess therein and has its inner end attached to the upper end of a rod 34, which extends down through the shaft 29 and attaches at its lower end to a latch-lever 35, which is fulcrumed to the hub portion of the segment 28, as at 36, and is adapted to have rocking movements with said segment and also relative thereto. The free end of the latch-lever 35 is adapted to engage within any one of the notches of a segmental rack 37, which is fixed to a stationary part of the vehicle, as to a casting 38, thus causing the control parts to be held in adjusted position. It is evident that a shifting of the control arm 32 effects an adjustment of the anchoring parts 24 to change the tension of the spring 23 and also its leverage on the arm 11 on the shaft 9, so that one spring accurately controls the engine for all proper positions and through a wide range of speeds.

The operation of our improved governing mechanism is as follows: When the governor is at rest the carbureter throttle 7 stands in what may be termed "full open" position, but which need not be full open position with relation to the carbureter, as it is only necessary that the throttle be open to such an extent as to enable it to have a closing or throttling down movement when the slide part 4 of the governor is moved outward, so that the engine, after a starting thereof, may be brought or throttled down to the speed at which it is desired to be run. The adjustment of the timer mechanism is also in accordance with the throttle movements. The full open position of the carbureter enables the engine to be easily started, and upon starting the outward movement of the governor part 4, which is caused by the rotation of the governor, imparts a movement to the arms 11 and 12, which in turn respectively move the timer lever 17 to advance the spark, and the throttle 7 to reduce the engine charges a sufficient extent to run the engine at the desired speed. If it is desired to increase or diminish the speed of running of the engine it is easily and quickly accomplished by simply moving the lever 33 to released position and then moving the control arm 32 to proper position to change the tension and leverage of the spring 23 on the lever arm 11 as desired, thus admirably adapting this control mechanism for use in motor driven vehicles, as it permits the changing of the speed of running of the same while the car is in motion and without the driver leaving his seat therein.

It is evident that the use of our improved governor makes possible an ideal automatic control of the time of ignition of the charges of an internal combustion engine. An automobile engine is required to operate under widely different conditions of speed and load, every change requiring a change in the time of ignition, if the spark is to work at its maximum efficiency. An expert driver can keep his "spark lever" in such a position as will enable the engine to deliver approximately its maximum power, but it is impossible for him to recognize and allow for every change of condition; and with the ordinary driver and ordinary conditions the timing is so far from ideal that some manufacturers prefer to use a fixed spark which may be right for the average speed with the average load, but which cannot be correct for other conditions. A little earlier spark than is necessary does not appreciably reduce the power nor interfere with the smooth working of the engine, but it does cause unnecessary wear on the engine, as shown by tests in which the indicated horsepower is increased as much as 3% by advancing the spark, while the brake horsepower remains practically the same. Some attempts have been made to secure an automatic timing of the ignition by means of a governor controlled circuit breaker on the magneto, but these have not come into general use, probably because they take account of only one of the variables hereinafter referred to—that is, the speed variable. The correct time for ignition depends upon three conditions as follows: 1. The size and shape of the combustion chamber and location of spark plug. Constant. 2. The density of the explosive mixture, and percentage of burned gas. Varies with the throttle position, especially on a four cycle engine. 3. Speed of motor. Varies at the will of the driver.

In our governing mechanism there is one lever, namely, 11, the position of which varies with the position of the throttle, due to the connection therebetween. This lever is also connected with the timer in such manner as to adjust the spark according to the density referred to in section 2 above. The position of another lever, namely, 24 determines the speed of the engine. This lever is also connected with the timer to take care of the changes in speed referred to in section 3 above. Inasmuch as both of the members 11 and 24 are connected to the timer, the time of ignition is changed with every change in density and speed, thus taking care of both variables 2 and 3 and giving the necessary advance under all conditions more accurately than the most expert driver.

We wish it understood that our invention is not limited to any specific construction or arrangement of the parts except in so far as such limitations are specified in the claims.

Having thus described our invention, what we claim as new, and desire to secure by Letters Patent, is,—

1. In combination, an internal combustion engine, a governor driven by the engine and controlling the supply of gas thereto, said governor having rotatable centrifugal parts, a spring, and leverage connection between said spring and parts, the spring resisting the centrifugal action of said parts and being adjustable to change the leverage on the parts at the same time its tension is changed.

2. In combination, an internal combustion engine, a governor driven by the engine and controlling the supply of gas thereto, said governor having rotatable centrifugal parts, a non-rotatable spring, and leverage connection between said spring and parts, the spring resisting the centrifugal action of said parts and being adjustable to change the leverage on said parts at the same time its tension is changed.

3. In combination, an internal combustion engine, a governor driven by the engine and controlling the supply of gas thereto, said governor having rotatable centrifugal parts, a non-rotatable spring, and leverage connection between said spring and parts, the spring resisting the centrifugal action of said parts and being adjustable to change the leverage on said parts.

4. In combination, an internal combustion engine, a governor driven by the engine and having rotatable centrifugal parts, a non-rotatable contractile spring, a lever connecting said parts and spring, said spring serving to resist the centrifugal action of said parts, anchorage means for said spring adjustable to change both its tension and leverage on said lever, and means actuated by the governor for controlling the supply of gas to the engine.

5. In combination, an internal combustion engine, a governor driven by the engine and having rotatable centrifugal parts, a non-rotatable spring, leverage connection between said spring and parts, the spring resisting the centrifugal action of said parts, an oscillatory anchorage member for said spring movable to change the tension of the spring and its leverage on said connection, and means actuated by the governor for controlling the supply of gas thereto.

6. In combination, an internal combustion engine, a governor driven by the engine and having rotatable centrifugal parts, a spring, leverage connection between said spring and parts, said spring coöperating with said connection to resist the centrifugal action of said parts, means operable to adjust the spring during a running of the engine to change its tension and also to change its leverage action on said connection, and means actuated by the governor for controlling the supply of gas to the engine.

7. In combination, an internal combustion engine, a fuel feed throttle therefor, a governor driven by the engine, a lever movable in one direction by said governor when running, connection between said lever and throttle whereby throttling movements are communicated to the throttle upon a running of the governor, and means yieldingly resisting a governor actuated movement of said lever and adjustable to change both the tension and leverage of such resistance.

8. In combination, an engine, a fuel feed throttle therefor, a governor operated by the engine, means connecting said governor and throttle for communicating predetermined movements to the throttle when the governor is operated, said means having a rocker-arm, a spring attached to and coöperating with said arm to resist a governor actuated movement of said means, a movable anchor member for said spring, and means operable at a distance from said anchor member during a running of the engine to move said member to change the tension of the spring and its leverage on the rocker-arm.

9. In combination, an internal combustion engine, a fuel feed throttle therefor, a governor driven by the engine, connection between said governor and throttle for controlling the movements of the throttle by a running of the governor, means yieldingly resisting a throttle actuating movement of said connection, a movable anchor member for said means, and mechanism operable during a running of the engine and at a distance from said anchor member for moving the latter to change both the tension and leverage of said means on said connection.

10. The combination with the timer and throttle valve of an internal combustion engine, of a governor mechanism actuated by the engine and having a part the position of which varies with the position of the throttle valve and a part movable to change the speed of running of the engine, and means connecting both of said parts with the timer and operable upon a movement of either to change the time of ignition.

11. The combination with the timer of an internal combustion engine, of a governor having rotatable centrifugal parts, a spring, and leverage connection between the spring and said parts and timer, the spring resisting the centrifugal action of said parts, and means manually adjustable to change the tension of said spring, and connection between said means and timer.

12. In combination, an internal combustion engine, a fuel feed throttle therefor, an ignition timer for the engine, a governor operated by the engine, means connecting the governor to said throttle and timer for imparting movements to each upon a running of the governor, and manually controlled means yieldingly resisting a governor actuated movement of said first means and being adjustable to change such resistance.

13. The combination with the timer of an internal combustion engine, of a governor actuated by the engine, a lever member movable by the governor, an adjustable control lever, a spring connecting said control lever and member to resist a governor actuated movement of said member, and means connecting both said lever member and control lever to the timer to cause a movement of the timer when either said member of control lever are moved.

14. The combination with the timer of an internal combustion engine, of a governor actuated by the engine, a lever member movable in one direction by the governor, and adjustable control lever, yielding connection between said member and control lever, and mechanism connecting said timer to said member and control lever, said mechanism comprising a lever having one arm in connection with the timer and its other arm in connection with both said member and control lever whereby movements of either will impart movements to the timer.

15. The combination with the timer of an internal combustion engine, of a governor actuated by the engine, a lever member movable in one direction by the governor, an adjustable control part, a spring connecting said part and member, the tension of the spring and its leverage action on said member being changed by an adjustment of said part, a lever, connection between one arm of said lever and the movable part of the timer, a cross-arm pivoted intermediate its ends to the other arm of said lever, and links projecting from the opposite ends of said cross-arm, one having connection with said lever member and the other having connection with said part whereby movements of either said member or part communicate movements to the timer to advance or retard the spark.

16. The combination with the throttle-valve of an internal combustion engine, of a governor actuated by the engine, a three-arm lever having one arm in connection with the governor whereby the lever is moved upon a movement of said governor in one direction, connection between another of said arms and the throttle valve for communicating movements from one to the other, and an adjustable control member having yielding connection with the remaining arm of said lever for resisting a governor actuated movement thereof.

17. The combination with the throttle-valve of an internal combustion engine, of a governor, a lever having connection with and movable in one direction by said governor, connection between said lever and throttle-valve, and manually controlled means having spring connection with said lever to resist a governor actuated movement of the lever and being adjustable to vary both the spring tension and the leverage action of the spring connection on said lever.

In testimony whereof, we have hereunto signed our names to this specification in the presence of two subscribing witnesses.

FRANK X. BACHLE.
WALTER W. WELLS.

Witnesses:
HOMER METZGAR,
J. C. L. KREBS.